No. 647,928. Patented Apr. 24, 1900.
C. F. ADAMS.
WASHER.
(Application filed Dec. 13, 1899.)
(No Model.)
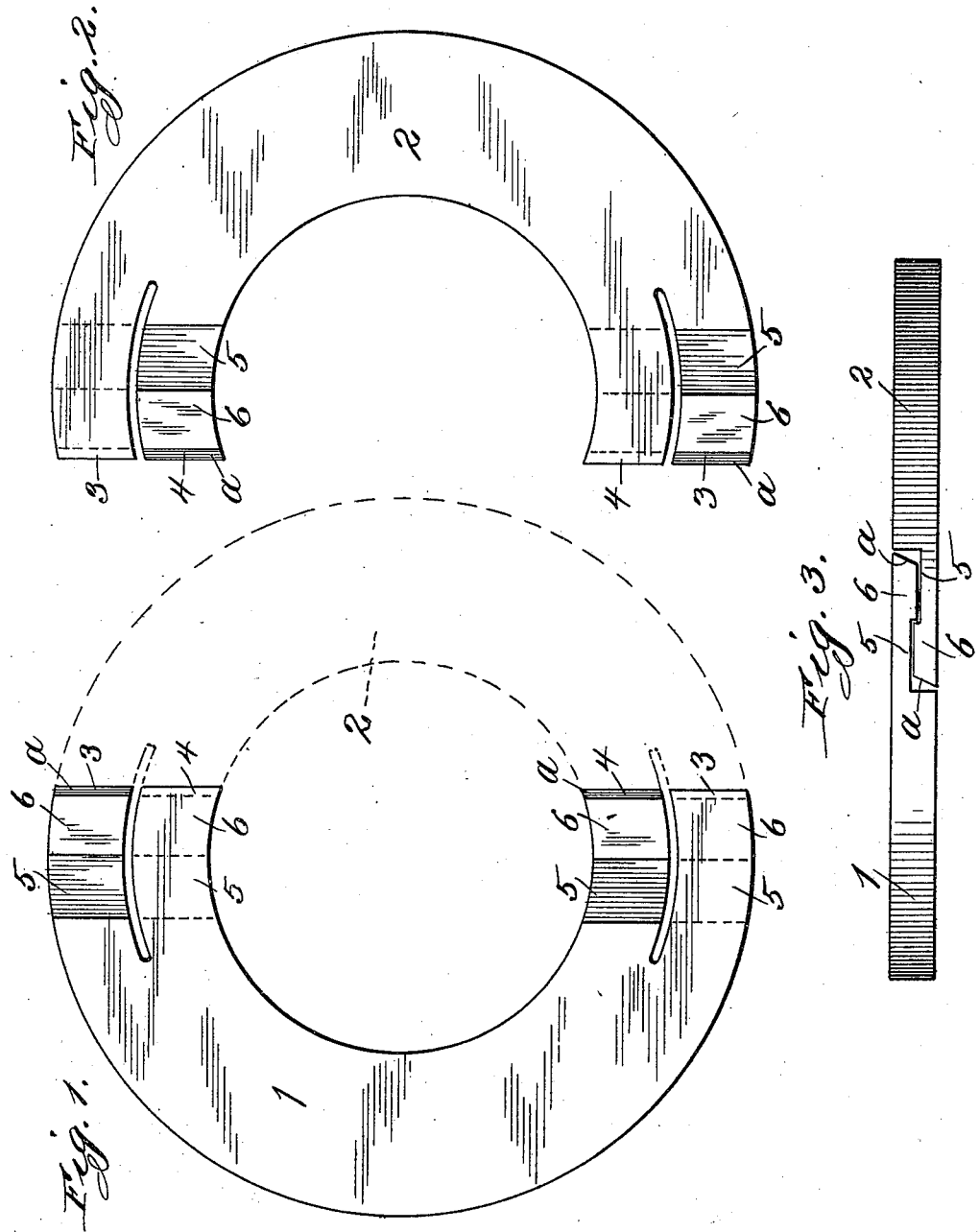
Witnesses:
R. J. Jacker.
J. L. Weaver
Inventor:
Charles F. Adams,
By Walter N. Haskell,
Atty.

UNITED STATES PATENT OFFICE.

CHARLES F. ADAMS, OF TAMPICO, ILLINOIS.

WASHER.

SPECIFICATION forming part of Letters Patent No. 647,928, dated April 24, 1900.

Application filed December 13, 1899. Serial No. 740,175. (No model.)

*To all whom it may concern:*

Be it known that I, CHARLES F. ADAMS, a citizen of the United States, residing at Tampico, in the county of Whiteside and State of Illinois, have invented certain new and useful Improvements in Washers; and I do declare the following to be a full, clear, and exact description of the invention, such as will enable others skilled in the art to which it appertains to make and use the same, reference being had to the accompanying drawings, and to the figures and letters of reference marked thereon, which form a part of this specification.

My invention pertains to washers, and relates more especially to the use of such devices on a shaft or spindle between contiguous faces of mechanism located thereon, one or both of such faces being provided with circular motion. It is specially adapted to be used in connection with hoisting machinery between a drum and clutch or on either side of a clutch, but is not limited to such use, the particular advantage of my invention lying in the fact that it can be placed in position or removed without disturbing or removing any of the mechanism on the shaft on which it is placed, as is necessary with the placing or renewing of washers now in use for the purposes referred to.

In the drawings, Figure 1 is a plan view of my device with the parts thereof separated. Fig. 2 is a side view thereof.

My device consists of two semicircular parts 1 and 2. Each end of each part 1 and 2 is bifurcated into the leaves 3 3 and 4 4. The thickness of each of these leaves is somewhat less than the thickness of the washer, and each leaf 3 and 4 has a transverse depression 5, leaving a projection or catch 6 on the end of each of such leaves. Each leaf 3 on either part of the washer is provided with a depression 5 and catch 6 on the reverse side from the other leaf 3 of the same part, and the same is true of the leaves 4, and each adjacent pair of leaves 3 and 4 are provided with such depressions and catches on reverse sides thereof. It is also apparent that the parts 1 and 2 are identical in form and size and that by reversing the part 1 or giving it a half-revolution it becomes the part 2 and that the parts 1 and 2 are adapted to be forced together, forming a complete washer, as shown by dotted lines in Fig. 1, the catches 6 of one part engaging corresponding depressions 5 in the other part and locking the device firmly together.

The operation of uniting the parts 1 and 2 is facilitated by beveling the ends of each of the leaves 3 and 4 on their inner faces, as at *a*, and the reduced thickness of such leaves caused by the depressions 5 permits the catches 6 to spring slightly outward in passing each other. In placing in position on a shaft the two parts are sprung together thereon between the pieces of mechanism the washer is intended to separate and can be replaced by prying the leaves apart, removing the washer, and replacing it with one of similar make. As before stated, this has heretofore been accomplished only by taking the mechanism apart and slipping the washer on or off over the end of the shaft.

It is evident that the construction of the parts 1 and 2 is such that when they are secured together they are locked at each end in two directions transversely of the plane of the washer and form a practically-inseparable washer either on or off the shaft.

My device is designed to be constructed of metal, but might under some conditions be made of other material.

What I claim as my invention, and desire to secure by Letters Patent of the United States, is—

A washer, composed of two semicircular parts; each of said parts having its ends divided into two leaves; all of which leaves are provided with a catch at the end thereof, and a depression in rear of such catch; the catches on each of said parts having beveled engaging edges, and being adapted to engage the depressions in the leaves of the other part; each alternate leaf on either of said parts having lateral resistance in an opposite direction to the one preceding; whereby said parts are adapted to be securely and firmly locked together, substantially as shown.

In testimony whereof I affix my signature in presence of two witnesses.

CHARLES F. ADAMS.

Witnesses:
 I. FOOHEY, Jr.,
 C. O. HUFFMAN.